US012278439B2

(12) United States Patent
Huang et al.

(10) Patent No.: US 12,278,439 B2
(45) Date of Patent: Apr. 15, 2025

(54) SHARED GROUND mmWave AND SUB 6 GHz ANTENNA SYSTEM

(71) Applicant: Huawei Technologies Co., Ltd., Shenzhen (CN)

(72) Inventors: Wei Huang, San Diego, CA (US); Ping Shi, San Diego, CA (US); Xiaoyin He, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 17/311,484

(22) PCT Filed: Apr. 28, 2019

(86) PCT No.: PCT/CN2019/084826

§ 371 (c)(1),
(2) Date: Jun. 7, 2021

(87) PCT Pub. No.: WO2020/119010

PCT Pub. Date: Jun. 18, 2020

(65) Prior Publication Data

US 2022/0029298 A1 Jan. 27, 2022

Related U.S. Application Data

(60) Provisional application No. 62/777,555, filed on Dec. 10, 2018.

(51) Int. Cl.
*H01Q 9/42* (2006.01)
*H01Q 1/22* (2006.01)
(Continued)

(52) U.S. Cl.
CPC ............. *H01Q 9/42* (2013.01); *H01Q 1/2283* (2013.01); *H01Q 1/243* (2013.01); *H01Q 5/35* (2015.01);
(Continued)

(58) Field of Classification Search
CPC .. H01Q 9/42; H01Q 5/35; H01Q 5/40; H01Q 1/2283; H01Q 1/243; H01Q 9/0407; H01Q 21/28
See application file for complete search history.

(56) References Cited

U.S. PATENT DOCUMENTS

2009/0251356 A1* 10/2009 Margomenos ....... H01Q 1/3233 342/70
2011/0279338 A1* 11/2011 Myszne .................. H01Q 5/35 343/725
(Continued)

FOREIGN PATENT DOCUMENTS

CN 106558765 A 4/2017
CN 108321498 A 7/2018
(Continued)

*Primary Examiner* — Dimary S Lopez Cruz
*Assistant Examiner* — Aladdin Abdulbaki
(74) *Attorney, Agent, or Firm* — Slater Matsil, LLP

(57) ABSTRACT

Embodiments of the present disclosure provide an apparatus for antenna placement and antenna arrangement to improve space saving in an antenna system that includes a plurality of antennas. In an embodiment, a common transmission line medium provides a feeding network for one antenna of the antenna system and a signal return path for a second antenna of the antenna system.

25 Claims, 10 Drawing Sheets

(51) Int. Cl.

| | |
|---|---|
| ***H01Q 1/24*** | (2006.01) |
| ***H01Q 5/35*** | (2015.01) |
| ***H01Q 5/40*** | (2015.01) |
| ***H01Q 9/04*** | (2006.01) |
| ***H01Q 21/28*** | (2006.01) |

(52) U.S. Cl.
CPC ............. *H01Q 5/40* (2015.01); *H01Q 9/0407* (2013.01); *H01Q 21/28* (2013.01)

(56) References Cited

U.S. PATENT DOCUMENTS

| | | | | |
|---|---|---|---|---|
| 2015/0188212 | A1* | 7/2015 | Tseng | H01Q 1/243<br>343/702 |
| 2016/0204499 | A1* | 7/2016 | Toh | H01Q 1/243<br>343/702 |
| 2017/0012344 | A1* | 1/2017 | Wu | H01Q 1/243 |
| 2017/0093049 | A1 | 3/2017 | Lahti et al. | |
| 2017/0214120 | A1 | 7/2017 | Lee et al. | |
| 2018/0233817 | A1 | 8/2018 | Izawa | |
| 2018/0277963 | A1 | 9/2018 | Desclos et al. | |
| 2018/0351235 | A1* | 12/2018 | Wang | H01Q 21/30 |
| 2018/0351589 | A1* | 12/2018 | Shin | H01Q 5/364 |
| 2019/0165470 | A1* | 5/2019 | Jeon | H01Q 1/243 |
| 2020/0106171 | A1* | 4/2020 | Shepeleva | H01Q 21/065 |
| 2020/0119454 | A1* | 4/2020 | Asrani | H01Q 1/243 |
| 2020/0136268 | A1* | 4/2020 | Saeidi | H01Q 1/243 |

FOREIGN PATENT DOCUMENTS

| | | | | | |
|---|---|---|---|---|---|
| CN | 108352621 | A | | 7/2018 | |
| CN | 108400450 | A | * | 8/2018 | H01Q 21/30 |
| CN | 108604726 | A | * | 9/2018 | H01Q 1/24 |
| CN | 208157615 | U | | 11/2018 | |
| WO | 2009029520 | A1 | | 3/2009 | |

* cited by examiner

SHARED GROUND mmWave AND SUB 6 GHz ANTENNA SYSTEM

PRIORITY CLAIM AND CROSS-REFERENCE

This patent application is a national phase filing under section 371 of PCT/CN2019/084826, filed Apr. 28, 2019 and entitled "Shared Ground mmWave and Sub 6 GHz Antenna System," which claims priority to U.S. Provisional Application No. 62/777,555, filed Dec. 10, 2018 and entitled "Shared Ground mmWave and Sub 6 GHz Antenna System," which applications are incorporated by reference in its entirety.

TECHNICAL FIELD

The present disclosure relates generally to an electronic device, and, in particular embodiments, to a system and method for an arrangement of antennas in an electronic device.

BACKGROUND

Mobile devices are equipped with an assortment of antennas, each designed to provide access to a different radio access technology (RAT). As an example, a mobile device may have different antennas to support third generation (3G), fourth generation (4G), Long-Term Evolution (LTE), and/or fifth generation (5G) New Radio (NR) wireless communications, and to access Wi-Fi, Bluetooth, near field communication (NFC), and/or global positioning satellite (GPS) signals.

Cellular phones have become slimmer with large display areas, limiting the bezel area typically appropriated for antenna placement. Therefore, as the number of antennas within a mobile device has increased, in contrast, the allotted footprint for these antennas has decreased. It is therefore beneficial to provide methods and structures for a compact arrangement and design for multiple antennas in electronic devices.

SUMMARY

Technical advantages are generally achieved by embodiments of this disclosure, which describe a system and method for an arrangement of antennas in an electronic device.

A first aspect relates to an antenna system in an electronic device, the antenna system includes a first antenna configured to operate at sub-6 gigahertz (GHz) frequencies; and a second antenna configured to operate at millimeter-wave frequencies, wherein a feeding network of the second antenna is embedded within a transmission line medium of a signal return path of the first antenna. Thus, a compact arrangement of the first and second antenna in the antenna system is realized.

In a first implementation form of the antenna system according to the first aspect as such, the transmission line medium is a stripline transmission line.

In a second implementation form of the antenna system according to the first aspect as such or any preceding implementation form of the first aspect, the first antenna is an inverted-F antenna (IFA), a loop antenna, or a slot antenna.

In a third implementation form of the antenna system according to the first aspect as such or any preceding implementation form of the first aspect, the first antenna includes a signal return path to a ground plane.

In a fourth implementation form of the antenna system according to the first aspect as such or any preceding implementation form of the first aspect, a ground plane of the first antenna is a ground plane of the second antenna. Thus, a common ground plane between the first antenna and the second antenna further improves compactness of the antenna system.

In a fifth implementation form of the antenna system according to the first aspect as such or any preceding implementation form of the first aspect, the first antenna includes a plurality of openings.

In a sixth implementation form of the antenna system according to the first aspect as such or any preceding implementation form of the first aspect, a radiating element of the first antenna is a ground plane of the second antenna. Thus a compact placement of multiple antennas in an antenna system is realized.

In an seventh implementation form of the antenna system according to the first aspect as such or any preceding implementation form of the first aspect, the second antenna includes an array of antenna elements configured to radiate at the millimeter-wave frequencies, each antenna element in the array of antenna elements radiating through a different one of the plurality of openings of the first antenna. Thus a compact placement of multiple antennas in an antenna system is realized.

In an eight implementation form of the antenna system according to the first aspect as such or any preceding implementation form of the first aspect, the second antenna includes an array of antenna elements configured to radiate at millimeter-wave frequencies, at least one antenna element in the array of antenna elements radiating through one of the plurality of openings of the first antenna. Thus a compact placement of multiple antennas in an antenna system is realized.

In a ninth implementation form of the antenna system according to the first aspect as such or any preceding implementation form of the first aspect, the second antenna further includes an array of antenna elements configured to radiate at millimeter-wave frequencies, and wherein the first antenna is a ground plane of each antenna element in the array of antenna elements. Thus, a common ground plane between the first antenna and the second antenna further improves compactness of the antenna system.

In a tenth implementation form of the antenna system according to the first aspect as such or any preceding implementation form of the first aspect, the second antenna is a dual polarized patch array antenna, a single polarized patch array antenna, a dipole antenna, a monopole antenna, or an aperture antenna.

In an eleventh implementation form of the antenna system according to the first aspect as such or any preceding implementation form of the first aspect, the second antenna is located within a metal frame of the electronic device.

In a twelfth implementation form of the antenna system according to the first aspect as such or any preceding implementation form of the first aspect, the electronic device includes a front comprising a display; a back opposing the front and comprising a back cover; and a side perpendicular to the front and the back and connecting the front to the back.

In a thirteenth implementation form of the antenna system according to the first aspect as such or any preceding implementation form of the first aspect, the back cover includes a dielectric material. The first antenna includes an internal metal frame located between the back cover and the front of the electronic device and is configured to radiate outwards and away from the back of the electronic device. Thus, the antenna is strategically placed to provide specific radiation coverage for the electronic device.

In a fourteenth implementation form of the antenna system according to the first aspect as such or any preceding implementation form of the first aspect, the back cover includes a dielectric material. The first antenna includes a metal on top of dielectric carrier and is configured to radiate outwards and away from the back of the electronic device. Thus, the antenna is strategically placed to provide specific radiation coverage for the electronic device.

In a fifteenth implementation form of the antenna system according to the first aspect as such or any preceding implementation form of the first aspect, the antenna system further includes a third antenna configured to operate at the millimeter wave frequencies. The third antenna is located on the back of the electronic device and configured to radiate outwards and away from the back of the electronic device. Thus, one antenna is strategically placed to provide specific radiation coverage for the electronic device.

In a sixteenth implementation form of the antenna system according to the first aspect as such or any preceding implementation form of the first aspect, the antenna system further includes a fourth antenna configured to operate at the millimeter wave frequencies. The fourth antenna located on the front of the electronic device and is configured to radiate outwards and away from the front of the electronic device. Thus, one antenna is strategically placed to provide specific radiation coverage for the electronic device.

In a seventeenth implementation form of the antenna system according to the first aspect as such or any preceding implementation form of the first aspect, the electronic device includes a first printed circuit board (PCB) comprising a processor and a modem. The second antenna further includes: a flex circuit; a circuit clip (c-clip); a second PCB electrically coupled to the first PCB using the c-clip; and an integrated circuit (IC) mounted on the second PCB. The IC is electrically coupled to the array of antenna elements using the flex circuit. Thus, a compact arrangement of the active/passive components and interconnecting components of one antenna in the antenna system is realized.

In an eighteenth implementation form of the antenna system according to the first aspect as such or any preceding implementation form of the first aspect, the electronic device includes a first printed circuit board (PCB) including a processor and a modem. The second antenna further includes: a flex circuit; a circuit clip (c-clip); a flex circuit board electrically coupled to the first PCB using the c-clip; and an integrated circuit (IC) mounted on the flex circuit board. The IC is electrically coupled to the array of antenna elements using the flex circuit. Thus, a compact arrangement of the active/passive components and interconnecting components of one antenna in the antenna system is realized.

In a nineteenth implementation form of the antenna system according to the first aspect as such or any preceding implementation form of the first aspect, the second antenna includes a first side and a second side opposing the first side, the array of antenna elements located on the first side.

In a twentieth implementation form of the antenna system according to the first aspect as such or any preceding implementation form of the first aspect, the electronic device includes a printed circuit board (PCB) having a board-to-board connector. The second antenna further includes an integrated circuit (IC) mounted on an opposing second side of the second antenna and a flex circuit electrically coupling the IC to the PCB through the board-to-board connector. Thus, a compact arrangement of the active/passive components and interconnecting components of one antenna in the antenna system is realized.

In a twenty-first implementation form of the antenna system according to the first aspect as such or any preceding implementation form of the first aspect, the second antenna further includes a first and second array of patch antennas. Each patch antenna of the first array of patch antennas is configured to radiate through a respective opening of a metal frame of the electronic device. The openings of the metal frame are located perpendicular to a display side of the electronic device. Each patch antenna of the second array of patch antennas is configured to radiate through a dielectric back cover of the electronic device. The dielectric back cover located opposite the non-display side of the electronic device. Thus, one antenna is strategically placed to provide specific radiation coverage for the electronic device.

In a twenty-second implementation form of the antenna system according to the first aspect as such or any preceding implementation form of the first aspect, the second antenna further includes a single polarized dipole array. Each element in the single polarized dipole array is configured to radiate between the metal frame and the display side of the electronic device. Thus, one antenna is strategically placed to provide specific radiation coverage for the electronic device.

A second aspect relates to an electronic device that includes a non-transitory memory storage comprising instructions; one or more processors configured to execute the instructions; and an antenna system in communication with the one or more processors and the non-transitory memory storage. The antenna system includes a first antenna configured to operate at sub-6 gigahertz (GHz) frequencies; and a second antenna configured to operate at millimeter-wave frequencies. A feeding network of the second antenna is embedded within a transmission line medium of a signal return path of the first antenna. Thus, a compact arrangement of the first and second antenna in the antenna system is realized.

In a first implementation form of the electronic device according to the second aspect as such, the transmission line medium is a stripline transmission line.

In a second implementation form of the electronic device according to the second aspect as such or any preceding implementation form of the second aspect, the first antenna is an inverted-F antenna (IFA), a loop antenna, or a slot antenna.

In a third implementation form of the electronic device according to the second aspect as such or any preceding implementation form of the second aspect, the first antenna includes a signal return path to a ground plane.

In a fourth implementation form of the electronic device according to the second aspect as such or any preceding implementation form of the second aspect, a ground plane of the first antenna is a ground plane of the second antenna. Thus, a common ground plane between the first antenna and the second antenna further improves compactness of the antenna system.

In a fifth implementation form of the electronic device according to the second aspect as such or any preceding implementation form of the second aspect, the first antenna includes a plurality of openings.

In a sixth implementation form of the electronic device according to the second aspect as such or any preceding implementation form of the second aspect, a radiating element of the first antenna is a ground plane of the second antenna. Thus a compact placement of multiple antennas in an antenna system is realized.

In a seventh implementation form of the electronic device according to the second aspect as such or any preceding implementation form of the second aspect, the second antenna includes an array of antenna elements configured to radiate at the millimeter-wave frequencies. Each antenna element in the array of antenna elements is configured to radiate through a different one of the plurality of openings of the first antenna. Thus a compact placement of multiple antennas in an antenna system is realized.

In an eight implementation form of the electronic device according to the second aspect as such or any preceding implementation form of the second aspect, the second antenna includes an array of antenna elements configured to radiate at millimeter-wave frequencies. At least one antenna element in the array of antenna elements radiating through one of the plurality of openings of the first antenna. Thus a compact placement of multiple antennas in an antenna system is realized.

In a ninth implementation form of the electronic device according to the second aspect as such or any preceding implementation form of the second aspect, the second antenna further includes an array of antenna elements configured to radiate at millimeter-wave frequencies. The first antenna is a ground plane of each antenna element in the array of antenna elements. Thus, a common ground plane between the first antenna and the second antenna further improves compactness of the antenna system.

In a tenth implementation form of the electronic device according to the second aspect as such or any preceding implementation form of the second aspect, the second antenna is a dual polarized patch array antenna, a single polarized patch array antenna, a dipole antenna, a monopole antenna, or an aperture antenna.

In an eleventh implementation form of the electronic device according to the second aspect as such or any preceding implementation form of the second aspect, the second antenna is located within a metal frame of the electronic device.

In a twelfth implementation form of the electronic device according to the second aspect as such or any preceding implementation form of the second aspect, the electronic device further includes: a front comprising a display; a back opposing the front and comprising a back cover; and a side perpendicular to the front and the back and connecting the front to the back.

In a thirteenth implementation form of the electronic device according to the second aspect as such or any preceding implementation form of the second aspect, the back cover includes a dielectric material. The first antenna includes an internal metal frame located between the back cover and the front of the electronic device. The first antenna configured to radiate outwards and away from the back of the electronic device. Thus, the antenna is strategically placed to provide specific radiation coverage for the electronic device.

In a fourteenth implementation form of the electronic device according to the second aspect as such or any preceding implementation form of the second aspect, the back cover includes a dielectric material. The first antenna includes a metal on top of dielectric carrier. The first antenna configured to radiate outwards and away from the back of the electronic device. Thus, the antenna is strategically placed to provide specific radiation coverage for the electronic device.

In a fifteenth implementation form of the electronic device according to the second aspect as such or any preceding implementation form of the second aspect, the antenna system further includes a third antenna configured to operate at the millimeter-wave frequencies. The third antenna located on the back of the electronic device and configured to radiate outwards and away from the back of the electronic device. Thus, the antenna is strategically placed to provide specific radiation coverage for the electronic device.

In a sixteenth implementation form of the electronic device according to the second aspect as such or any preceding implementation form of the second aspect, the antenna system further includes a fourth antenna configured to operate at the millimeter-wave frequencies. The fourth antenna located on the front of the electronic device and configured to radiate outwards and away from the front of the electronic device. Thus, the antenna is strategically placed to provide specific radiation coverage for the electronic device.

In a seventeenth implementation form of the electronic device according to the second aspect as such or any preceding implementation form of the second aspect, the electronic device further includes a first printed circuit board (PCB) that includes the processor and a modem. The second antenna further includes: a flex circuit; a circuit clip (c-clip); a second PCB electrically coupled to the first PCB using the c-clip; and an integrated circuit (IC) mounted on the second PCB. The IC configured to electrically couple to the array of antenna elements using the flex circuit. Thus, a compact arrangement of the active/passive components and interconnecting components of one antenna in the antenna system is realized.

In an eighteenth implementation form of the electronic device according to the second aspect as such or any preceding implementation form of the second aspect, the electronic device further includes a first printed circuit board (PCB) comprising the processor and a modem, wherein the second antenna further includes: a flex circuit; a circuit clip (c-clip); a flex circuit board electrically coupled to the first PCB using the c-clip; and an integrated circuit (IC) mounted on the flex circuit board. The IC configured to electrically couple to the array of antenna elements using the flex circuit. Thus, a compact arrangement of the active/passive components and interconnecting components of one antenna in the antenna system is realized.

In a nineteenth implementation form of the electronic device according to the second aspect as such or any preceding implementation form of the second aspect, the second antenna includes a first side and a second side opposing the first side. The array of antenna elements located on the first side.

In a twentieth implementation form of the electronic device according to the second aspect as such or any preceding implementation form of the second aspect, the electronic device further includes a printed circuit board (PCB) having a board-to-board connector. The second antenna further includes an integrated circuit (IC) mounted on an opposing second side of the second antenna and a flex circuit configured to electrically couple the IC to the PCB through the board-to-board connector. Thus, a compact arrangement of the active/passive components and interconnecting components of one antenna in the antenna system is realized.

In a twenty-first implementation form of the electronic device according to the second aspect as such or any preceding implementation form of the second aspect, the second antenna further includes: a first and second array of patch antennas. Each patch antenna of the first array of patch antennas is configured to radiate through a respective opening of a metal frame of the electronic device. The openings of the metal frame located perpendicular to a display side of the electronic device. Each patch antenna of the second array of patch antennas is configured to radiate through a dielectric back cover of the electronic device. The dielectric back cover located opposite the non-display side of the electronic device. Thus, one antenna is strategically placed to provide specific radiation coverage for the electronic device.

In a twenty-second implementation form of the electronic device according to the second aspect as such or any preceding implementation form of the second aspect, the second antenna further includes a single polarized dipole array. Each element in the single polarized dipole array is configured to radiate between the metal frame and the display side of the electronic device. Thus, one antenna is strategically placed to provide specific radiation coverage for the electronic device.

In a twenty-third implementation form of the electronic device according to the second aspect as such or any preceding implementation form of the second aspect, the electronic device is a cellular device, a tablet, a personal computer, a mobile station (STA), a smartwatch, or a cellular-connected vehicle.

In a twenty-fourth implementation form of the electronic device according to the second aspect as such or any preceding implementation form of the second aspect, the electronic device is an enhanced Node B (eNodeB or eNB), a gNB, a transmit/receive point (TRP), a macro-cell, a femtocell, or a Wi-Fi Access Point (AP).

A third aspect relates to an antenna system in an electronic device comprising a first radiating element configured to operate at a first frequency band; a second radiating element configured to operate at a second frequency band; and a shared transmission line medium coupled to the first radiating element and the second radiating element, the shared transmission line medium configured to provide a feeding network for the first radiating element and provide a signal return path for the second radiating element.

In a first implementation form of the antenna system according to the third aspect as such, the first frequency band is a millimeter-wave frequency band.

In a second implementation form of the antenna system according to the third aspect as such or any preceding implementation of the third aspect, the second frequency band is a sub-6 Gigahertz (GHz) frequency band.

In a third implementation form of the antenna system according to the third aspect as such or any preceding implementation of the third aspect, the transmission line medium is a stripline transmission line.

In a fourth implementation form of the antenna system according to the third aspect as such or any preceding implementation of the third aspect, the antenna system further includes a first antenna having a plurality of the first radiating element.

In a fifth implementation form of the antenna system according to the third aspect as such or any preceding implementation of the third aspect, the first antenna is a dual polarized patch array antenna, a single polarized patch array antenna, a dipole antenna, a monopole antenna, or an aperture antenna.

In a sixth implementation form of the antenna system according to the third aspect as such or any preceding implementation of the third aspect, the antenna system further includes a second antenna having a plurality of the second radiating element.

In a seventh implementation form of the antenna system according to the third aspect as such or any preceding implementation of the third aspect, the second antenna is an inverted-F antenna (IFA), a loop antenna, or a slot antenna.

In an eight implementation form of the antenna system according to the third aspect as such or any preceding implementation of the third aspect, the second antenna comprises a signal return path to a ground plane.

In a ninth implementation form of the antenna system according to the third aspect as such or any preceding implementation of the third aspect, a ground plane of the first antenna is a ground plane of the second antenna.

In a tenth implementation form of the antenna system according to the third aspect as such or any preceding implementation of the third aspect, the second radiating element is a ground plane of the first radiating element.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
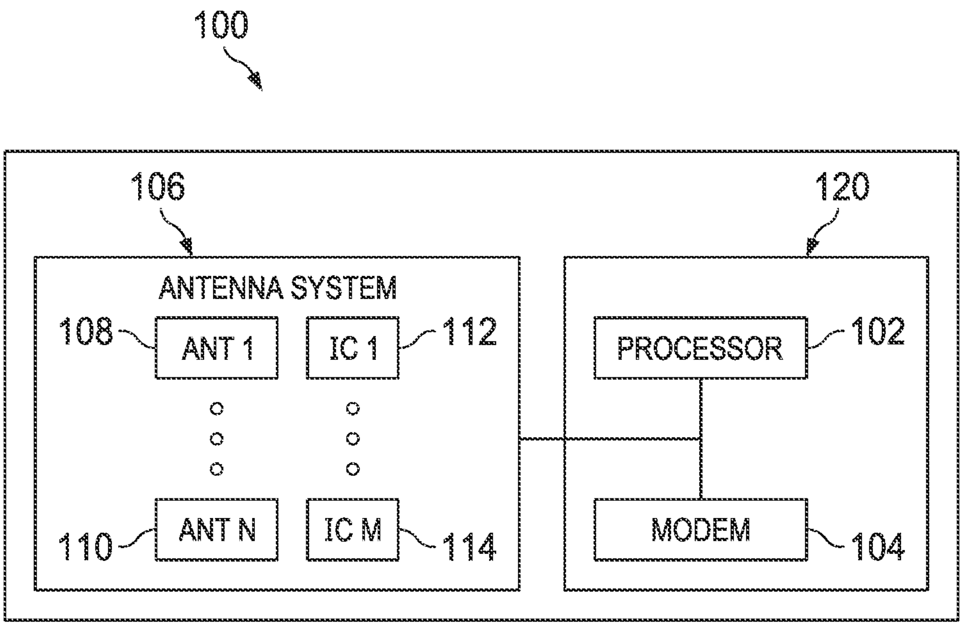
FIG. 1 is a diagram of an embodiment electronic device capable of operating over multiple radio access technologies (RATs)

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims.

While the inventive aspects are described primarily in the context of an antenna system operating over sub-6 gigahertz (GHz) and millimeter wave (mmWave) frequencies, it should also be appreciated that these inventive aspects may also be applicable to other antennas operating over other frequency spectrums, which can also take advantage of the inventive concepts disclosed herein. Furthermore, while the various embodiments presented in this disclosure are described primarily in the context of an antenna system on a mobile device, the resulting antenna system may provide wireless communication in a base station that can benefit from antenna placement and antenna arrangement compactness.

The emergence of data heavy applications, such as virtual reality (VR), augmented reality (AR), big data analytics, artificial intelligence (AI), three-dimensional (3D) media, ultra-high definition transmission video, and the like, have created a significant growth in the volume of data exchanged within wireless networks. Fifth generation (5G) New Radio (NR) cellular mobile communication can provide a wireless network framework for these types of applications. 5G NR provides for an increased bandwidth, higher data rates, and higher system capacity than in currently available communication technologies.

A common deployment strategy for the transition from LTE to 5G NR is the addition of 5G NR base stations (i.e., gNB or gNodeB) to existing Long-Term Evolution (LTE) wireless communication networks, which provide a wide coverage layer to the network operators. To support new, current, and previous generation of networks, mobile devices are equipped with a variety of antennas to provide operational capabilities within 2G/3G/4G/LTE/5G NR. This is in addition to other antennas that may provide support for, for example, data or power transference (e.g., global positioning satellite (GPS), Wi-Fi, Bluetooth, and near field communications (NFC), etc.).

Embodiments of this disclosure provide structures and methods for arrangement and design of compact antenna systems capable of operating over multiple radio access technologies (RATs). According to various embodiments of the present disclosure, an antenna system and a method of operation and assembly are provided. The antenna system includes a sub-6 GHz antenna and a millimeter wave (mmWave) antenna, supporting sub-6 GHz and mmWave frequency spectrums, respectively. In an embodiment, the feed network for the mmWave antenna is embedded within a transmission line medium, which concurrently provides a signal return path for the sub-6 GHz antenna and, optionally for the mmWave antenna, to a ground plane. This arrangement allows for a more compact design and an improvement in component placement volumetric efficiency within the host device.

The transmission line medium may be, for example, a stripline or a microstrip. The sub-6 GHz antenna may be an inverted-F antenna (IFA), a loop antenna, a slot antenna, or any other antenna type having a signal return path to a ground plane. An example of the mmWave antenna may be a dual-polarized patch array antenna. The mmWave antenna may support both horizontal and vertical polarizations with main beams pointing away from the mobile device and in the same direction. In certain embodiments, grounded via structures within the transmission line medium may provide for an improved isolation between the mmWave antenna signal and the sub-6 GHz antenna signal. In some embodiments, the sub-6 GHz antenna may include a plurality of openings or cavities. In such an embodiment, the mmWave antenna may include an array of antenna elements configured to radiate at mmWave carrier frequencies, and each antenna element in the array of antenna elements may radiate through a different one of the plurality of openings, or cavities, of the sub-6 GHz antenna. In another embodiment, the mmWave antenna may be a patch antenna located above the sub-6 GHz antenna, where a radiator of the sub-6 GHz antenna is a ground plane of the mmWave antenna.

In an embodiment, the mmWave antenna can include an array of antenna elements, a flex circuit, a circuit clip (c-clip), printed circuit boards (PCBs) connected to via c-clips, and an integrated circuit (IC). In some embodiments, the PCB may be a flex a circuit board. In some embodiments, the mmWave antenna can be arranged within a metal frame of the mobile device. In some embodiments, the sub-6 GHz antenna can include a dielectric cover facing the outside portion of the mobile device and an internal metal frame or a metal on top of a dielectric carrier facing the interior portion of the mobile device. In one embodiment, the integrated circuit is located on an opposing side to the array of antenna elements. In another embodiment, the mmWave antenna is connected to a PCB of the mobile device through a board-to-board connector and the flex circuit. The flex circuit can electrically connect the IC to the main PCB housing a processor and a modem. In an example embodiment, the mmWave antenna can include a first (e.g., 1×4 patch array) and a second (e.g., 2×2 patch array) array of patch antennas. Each patch antenna of the first array may radiate through a respective opening of a metal frame of the electronic device located perpendicular to a display side of the electronic device, providing coverage for the side of the phone. Each patch antenna of the second array may radiate through a dielectric back cover of the electronic device located opposite the display side of the electronic device, providing coverage for the back of the phone. In one embodiment, the mmWave antenna can include a single polarized dipole array. Each element in the single polarized dipole array may radiate between the metal frame and the display side of the electronic device, providing coverage for the front of the phone. These and other details are discussed in greater detail below.

FIG. 1 illustrates an embodiment electronic device 100 capable of operating over multiple radio access technologies (RATs). In some embodiments, the electronic device 100 may be any user-side device configured to access a network, such as a cellular device, a tablet, a personal computer, a mobile station (STA), a smartwatch, a vehicle, or any other wirelessly enabled user-side device. The user-device may provide wireless access to a base station, a global positioning satellite (GPS), a user equipment (UE), an inductive power source, or the like.

In other embodiments, the electronic device 100 may be any network-side device configured to provide wireless access to a network, such as an enhanced Node B (eNodeB or eNB), a gNB, a transmit/receive point (TRP), a macrocell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. In some embodiments, the electronic device 100 may include various other wireless devices, such as modems, sensors, graphics processors, etc.

As shown, the electronic device 100 includes a processor 102, a modem 104, and an antenna system 106, which may (or may not) be arranged as shown. The processor 102 may be any component or collection of components adapted to perform computations and/or other processing related tasks, and the modem 104 may be any component or collection of components adapted to generate communication signals for execution by the processor 102. The processor 102 and the modem 104 may be housed within a main printed circuit board (PCB) 120.

The electronic device 100 is shown to have a single processor. However, in some embodiments multiple processors may be included in the electronic device 100. In some embodiments, the electronic device 100 may include different types of processing units, such as a graphics processing unit (GPU), a digital signal processor (DSP), etc.

The UE 100 may include additional components not depicted in FIG. 1, such as a non-transitory computer readable medium, long-term storage (e.g., non-volatile memory, etc.) or a phase locked loop.

The antenna system 106 includes N number of antennas, antenna 1 108 to antenna N 110. Each antenna is capable of accessing a same or a different network, satellite, or device. The antenna is used to radiate or to receive signals, and able to operate across a variety of frequency spectrums.

The antenna system 106 also includes M number of integrated circuits (ICs), IC 1 112 to IC M 114. The ICs connect the various components of the host device to one another, to amplify a signal, to filter out signals, etc. In an embodiment, each antenna (e.g., Ant 1 108 to Ant N 110) is connected to the processor 102 and modem 104 through an integrated circuit or a discrete circuit. In some embodiments, an integrated circuit may connect multiple antennas to the processor 102 and modem 104. In other embodiments, some antennas may share a common integrated circuit for connection to the processor 102 and/or modem 104.

Embodiments of this disclosure provide a space saving structure that allows a transmission line medium used for a signal return path of one antenna to be used as a feed network for a second antenna. In some embodiments, the signal return path for the first antenna may also be the signal return path for the second antenna. The ground structure of the transmission line medium additionally isolates the signal of the second antenna from the signal of the first antenna.

A mmWave antenna, be it an antenna on board (AoB) type or antenna in package (AiP) type, generally has no electrical direct current (DC) connection with a sub-6 GHz antenna. The mmWave antenna exists separately from the sub-6 GHz antenna, each radiating separately without sharing any common components. However, embodiments of this disclosure provide a mmWave antenna that all or portions of the antenna may connect with all or portions of the sub-6 GHz antenna. The connection between the two antennas may be a high impedance line, or lines, that may be used as ports of the sub-6 GHz antenna. In other words, the mmWave antenna implementation in, for example a 5G system, can coexist with a sub-6 GHz radio within a shared volume.

Figure 2A:
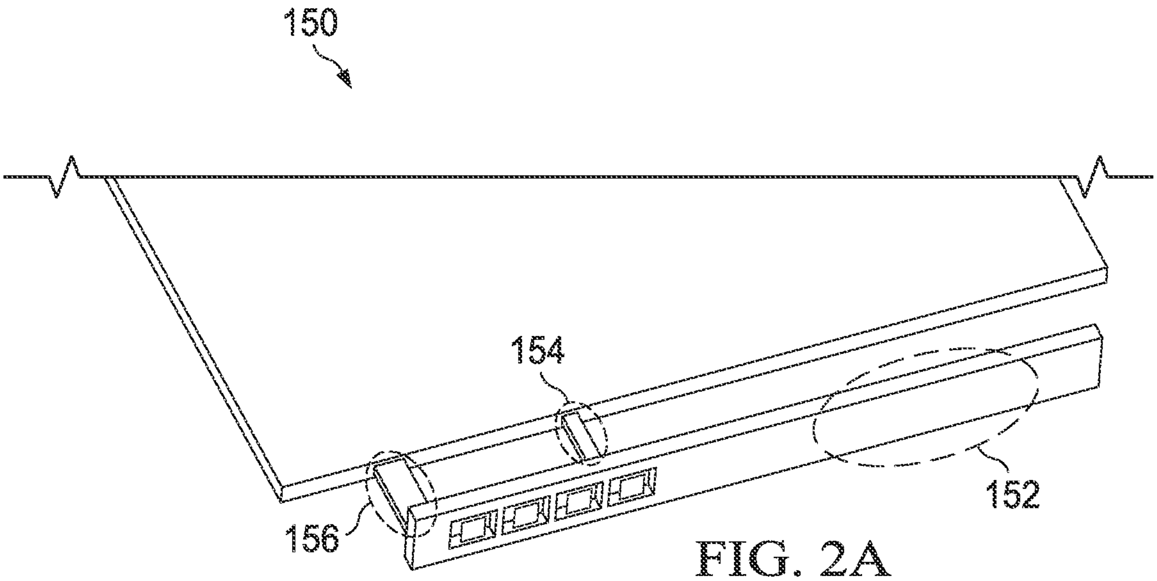
FIG. 2A is a top angular view of an embodiment antenna system that includes a first antenna and a second antenna.
Figure 2B:
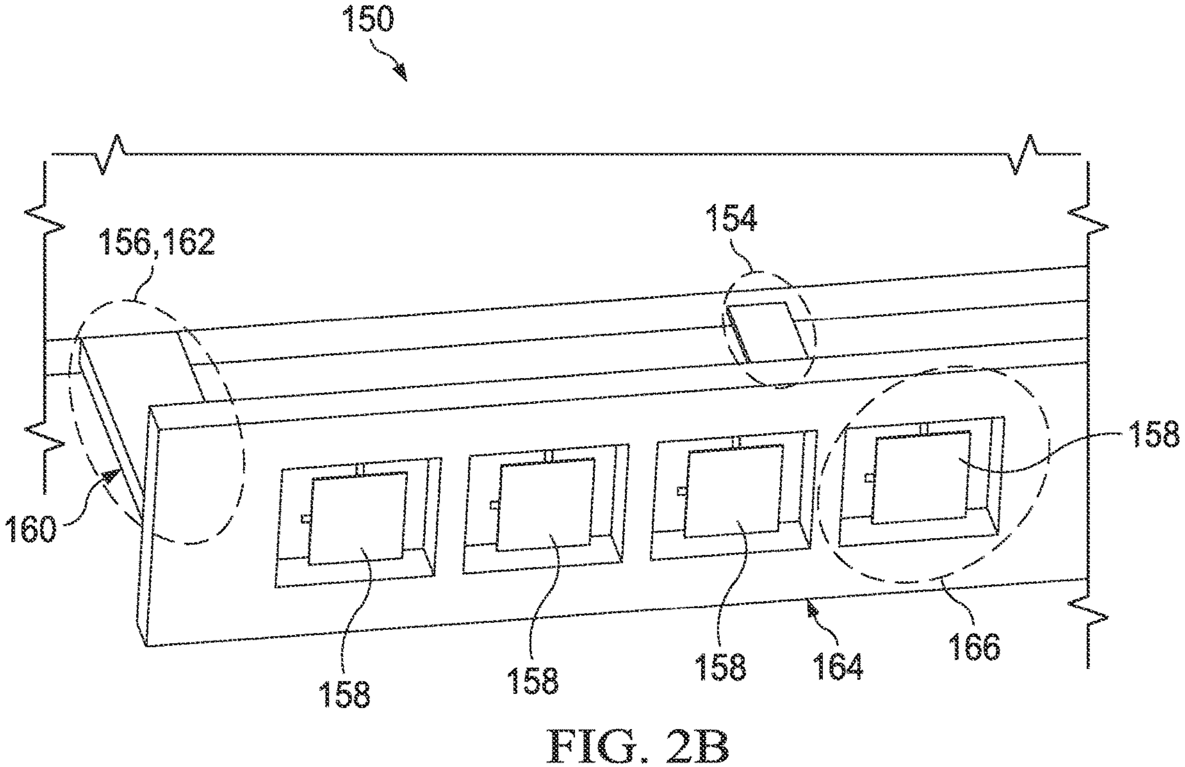
FIG. 2B is an enlarged front-side view of the embodiment antenna system that includes a first antenna and a second antenna.
Figure 2C:
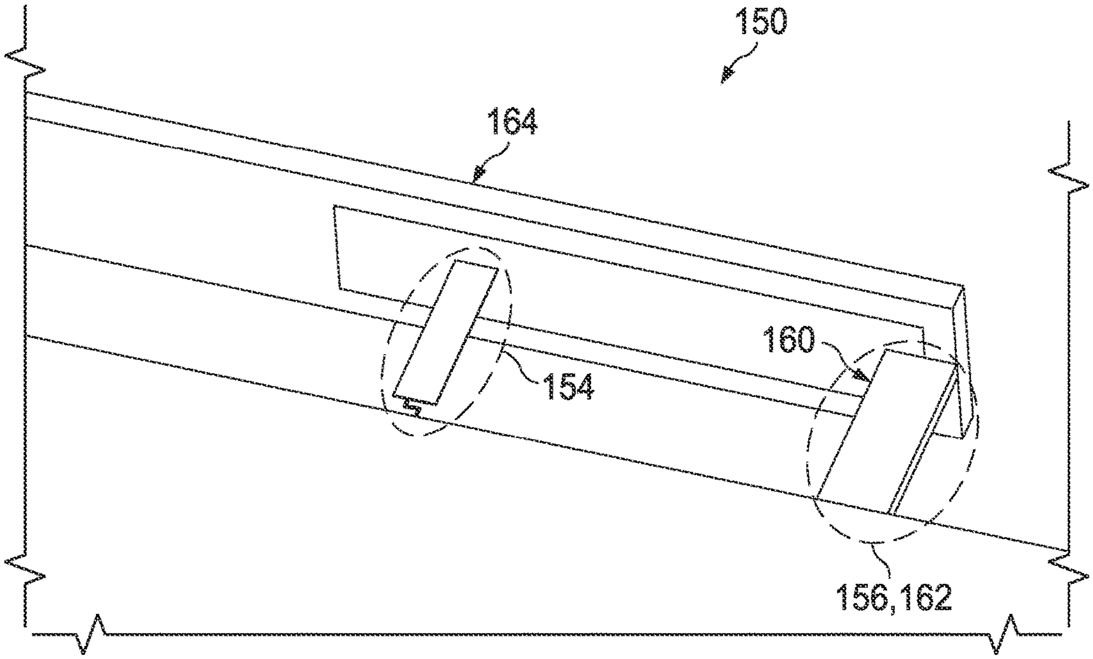
FIG. 2C is an enlarged back-side view of the embodiment antenna system that includes a first antenna and a second antenna.

FIGS. 2A-C illustrate multi-angular views of an embodiment antenna system 150 that includes a compact arrangement of shared components in a first antenna and a second antenna. In particular, FIG. 2A illustrates a top angular view of the embodiment antenna system 150, FIG. 2B illustrates an enlarged front-side of the embodiment antenna system 150, and FIG. 2C illustrates an enlarged back-side view of the embodiment antenna system 150. The first antenna of the antenna system 150 is capable of operating over the sub-6 GHz frequency spectrum. The second antenna of the antenna system 150 is capable of operating over the mmWave frequency spectrum.

The first antenna may be any type of antenna having a signal return path to a ground plane and capable of operating over the sub-6 GHz frequency spectrum. The first antenna includes a radiating element 152, a feed network 154, and a signal return path 156. The ground plane for the sub-6 GHz antenna is electrically connected to a common ground of the antenna system 150 through the signal return path 156.

Any type of transmission line medium, such as a stripline, a microstrip, a waveguide, or the like, that includes a conductive path separate from the signal return path may be used for the signal return path 156. In an embodiment, the signal return path 156 may be a stripline transmission line that includes a strip of conductive metal sandwiched between two parallel ground plates and insulated by a dielectric material. The parallel ground plates provide a signal return path for both the first and the second antenna. In such embodiments, the conductive metal provides the feed path for the second antenna. In some embodiments, via structures may connect the parallel ground plates of the transmission line medium to each other, creating a walled plane on the sides of the conductive metal. The parallel ground plates and the walled via structure provide isolation for the feed path of the second antenna from outside signals that may interfere with signal distribution.

As shown, the first antenna may be an inverted-F antenna (IFA) capable of operating over the sub-6 GHz (i.e., below 6 GHz) frequency spectrum. In some embodiments, the inverted-F antenna may be used in a planar implementation for wireless circuitry in the form of a planar inverted-F antenna (PIFA), a printed inverted-F antenna, a meandered printed inverted-F antenna, a patch antenna, a shorted patch antenna, or the like. The inverted-F antenna may be constructed within, for example, a microstrip electromagnetic transmission line medium. In such embodiments, the antenna element is wide with the ground plane located underneath. In other embodiments, the sub-6 GHz antenna may be a loop antenna, a slot antenna, or any other type of antenna used to support operational functionality in the below 6 GHz frequency spectrum.

The second antenna may be any type of antenna having a feed network implemented in a conductive component of a transmission line that also includes a ground plane providing a signal return path for the sub-6 GHz antenna. The second antenna includes a radiating element 158, a signal trace 160, and a signal return path 162. In some embodiments, the signal return path 156 of the first antenna may be the signal return path 162 of the second antenna.

As shown, the second antenna is a 1×4 dual polarized patch array antenna capable of operating over the millimeter wave frequency spectrum (i.e., between 30 GHz and 300 GHz). The number of patch array elements and the arrangement (row and/or column) of the elements are non-limiting, and other arrangements of varying quantities may be contemplated. The illustration of the second antenna being a dual polarized patch array antenna is a non-limiting example and, in other embodiments, the second antenna may be a single polarized patch array antenna, a dipole antenna, a monopole antenna, an aperture antenna, or the like.

In one embodiment, the radiator of the sub-6 GHz antenna (e.g., inverted-F antenna) may use the metal frame 164 around the mobile phone and the sub-6 GHz antenna may include a plurality of openings 166 or cavities. In such an embodiment, the mmWave antenna may include an array of antenna elements configured to radiate at mmWave carrier frequencies, and each antenna element in the array of antenna elements may radiate through a different one of the plurality of openings 166 or cavities of the sub-6 GHz antenna. It is also contemplated that in some other embodiments, two or more antenna elements may share and radiate through a same opening or cavity of the sub-6 GHz antenna.

In another embodiment, each patch antenna array element may face an opening of the sub-6 GHz antenna radiator and radiate through the openings. In such embodiments, the metal portion in-between the openings may improve isolation between the patch array elements.

Optionally, in another embodiment, the mmWave antenna may be a patch antenna located above the sub-6 GHz antenna, where a radiator of the sub-6 GHz antenna is a ground plane of the mmWave antenna.

Figure 3A:
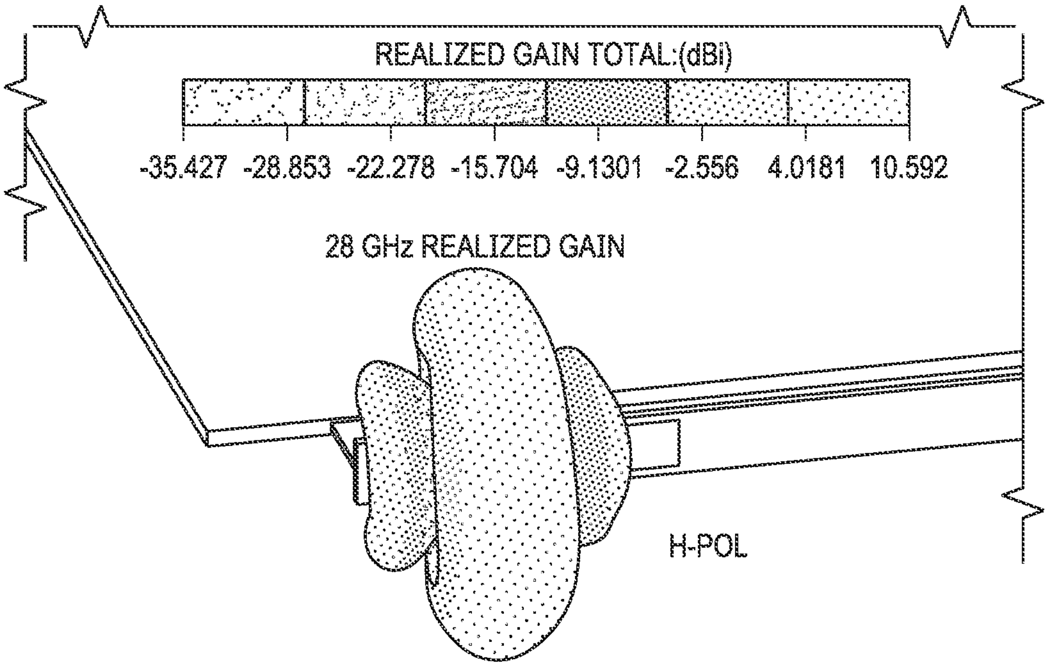
FIG. 3A is a horizontal gain pattern corresponding to the second antenna of an embodiment antenna system.
Figure 3B:
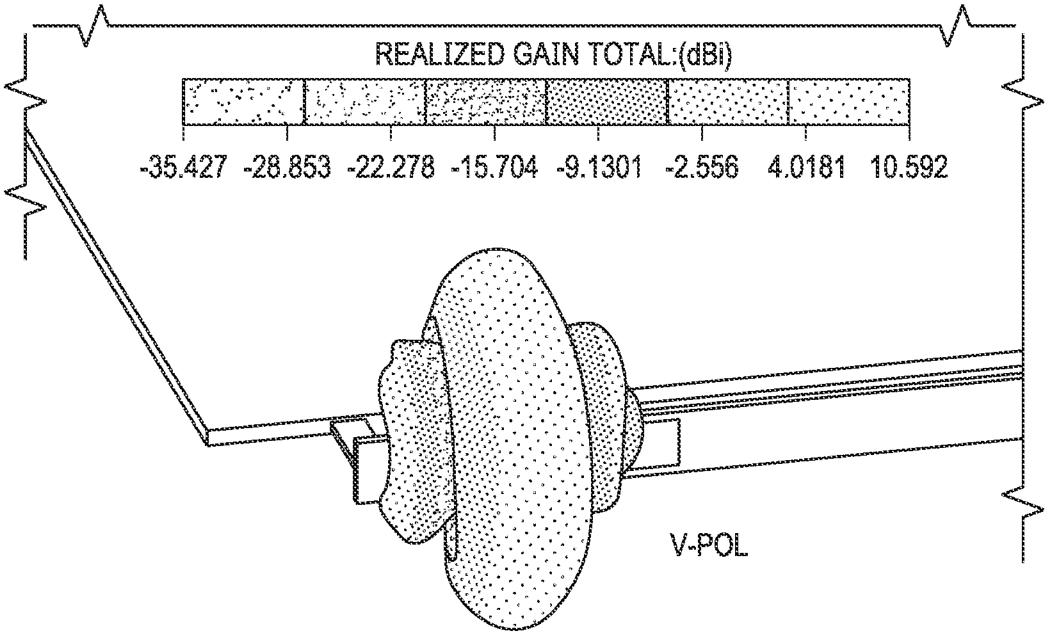
FIG. 3B is a vertical gain pattern corresponding to the second antenna of an embodiment antenna system.

FIGS. 3A-B illustrate gain patterns in a horizontal and a vertical polarization corresponding to the second antenna of the embodiment antenna system 150. In particular, FIG. 3A is a realized horizontal gain pattern of the second antenna operating over the millimeter-wave frequency spectrum. FIG. 3B is a realized vertical gain pattern of the second antenna operating over the millimeter wave frequency spectrum.

The realized gain patterns shown in FIGS. 3A-B illustrate the realized gain pattern of the embodiment 1×4 dual polarized patch antenna radiating through the openings of the exterior frame of a host device. As shown, the mmWave antenna supports both horizontal and vertical polarizations. The main beams point away from the mobile device, and in the same direction.

It should be appreciated that the first antenna and the second antenna, of the antenna system 150, are isolated from each other at greater than 30 dB up to, at least, 35 GHz and at some frequencies at greater than 40 dB. This isolation is greater in the vertical polarization, where it is consistently greater than 40 dB up to, at least, 35 GHz.

The system efficiency of the first antenna may be greater than −8 dBp. In particular, at frequencies between 0.8 GHz and 1.6 GHz, the system efficiency is greater than −4 dBp. The return loss of the first antenna may be less than 14 dB. In particular, at frequencies between 1 and 1.8 GHz, the return loss of the first antenna may be between 2 and 8 dB, depending on the particular frequency.

Figure 4A:
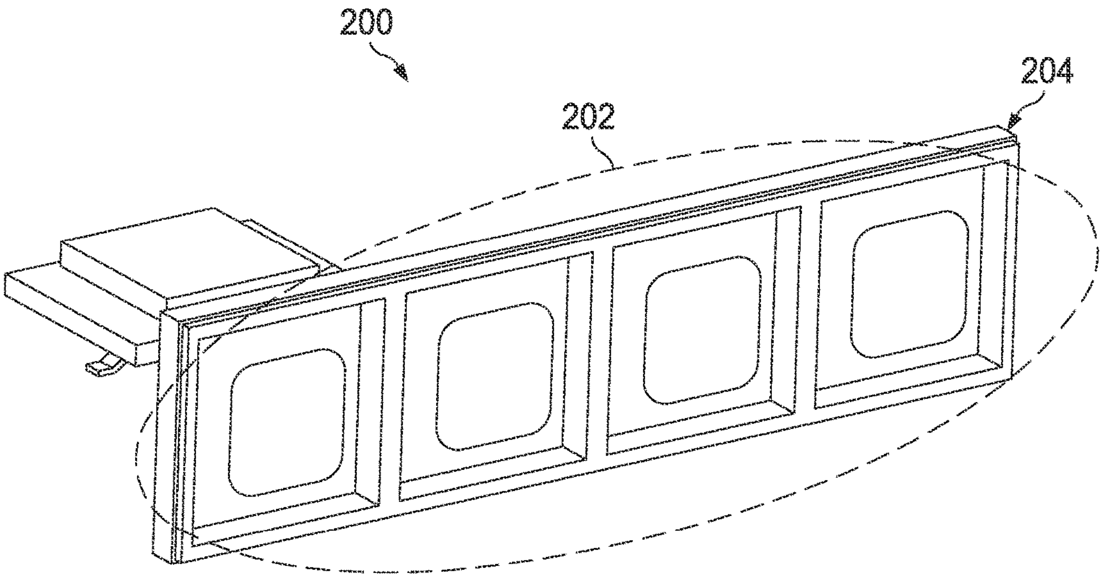
FIGS. 4A-B are multi-angle views of an embodiment antenna system.
Figure 4B:
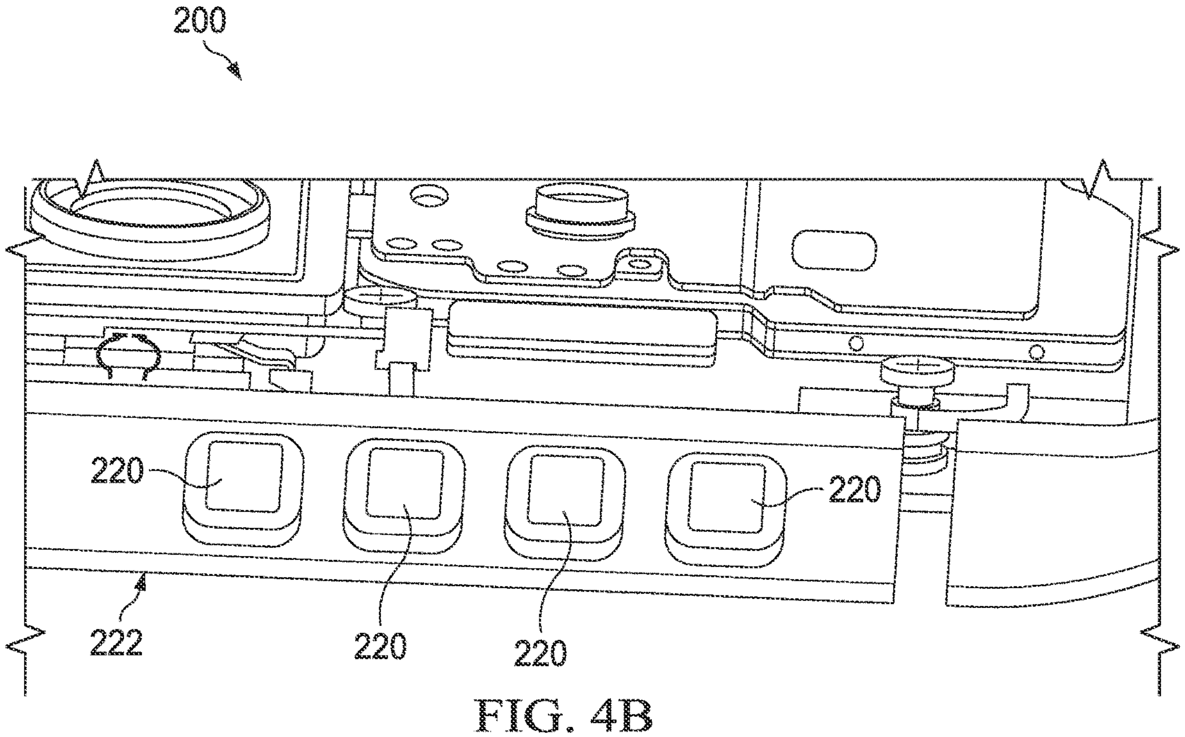

FIGS. 4A-D illustrate multi-angular views of an embodiment antenna system 200. FIG. 4A illustrates an angular front-side view of the embodiment antenna 200. FIG. 4B illustrates an angular front-side view of the embodiment antenna system 200 placed within a metal frame of a mobile device. In this embodiment, the metal frame of the mobile device may act as the ground plane of the sub-6 GHz antenna.

The antenna system 200 includes a patch array antenna 202 operating over the mmWave frequency spectrum. The antenna system 200 also includes a second antenna 204 configured to operate over the sub-6 GHz frequency spectrum.

As shown, the patch array antenna 202 is shown to have four elements arranged in a single row (i.e., 1×4 patch array antenna). In other embodiments, the patch array antenna 202 may include different number of elements, which may be arranged in different configurations. Therefore, it should be understood that the number of elements in the patch array antenna 202 is non-limiting, and may have varying number of elements that may be arranged in a variety of configurations.

The patch array antenna 202 radiates through an opening 220 of the mobile device, for example, an opening 220 on the side metal frame 222 as shown in FIG. 4B. The patch array antenna 202 provides side coverage perpendicular to the side of, and away from, the mobile device. The metal frame 222 may act as a ground structure for the second antenna 204, which may also be shared as a ground structure for the first patch array antenna 202.

In some embodiments, the second antenna 204 may have openings allowing for the patch array antenna 202 to radiate through. In some embodiments, the patch array antenna 202 may be located on top of the second antenna 204. In such an embodiment, the patch array antenna 202 uses the radiator of the second antenna 204 as a ground plane. In some embodiments, the second antenna 204 may be a device with a dielectric cover on the outside and an internal metal frame. In other embodiments, the second antenna 204 may be a device with a dielectric cover on the outside and a metal on top of dielectric carrier as the antenna.

Figure 4C:
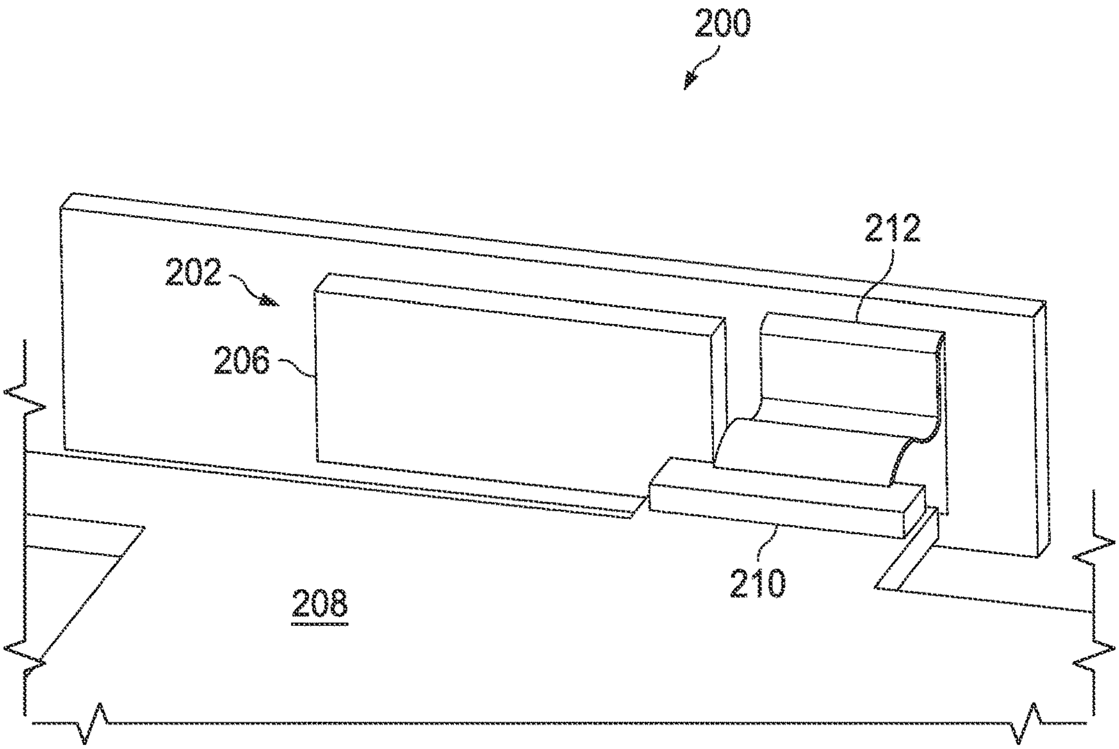
FIG. 4C is an angular backside view of the embodiment antenna system.

FIG. 4C illustrates an angular backside view of the embodiment antenna 200. In this embodiment, an integrated circuit (IC) 206 is located on the backside of the patch array antenna 202. The IC 206 is connected to the patch array antenna 202 through the metal frame structure and to the main board 208 of the mobile device. The main board 208 may be a printed circuit board (PCB) that may include the processor 102, the modem 104, and a board-to-board connector 210. The board-to-board connector may be any type of interface that allows for an electrical connection access to and/or from the components of the main board 208. The IC 206 may be connected to the board-to-board connector 210 using a connector 212. In some embodiments, the circuit 212 may be a flex circuit.

Figure 4D:
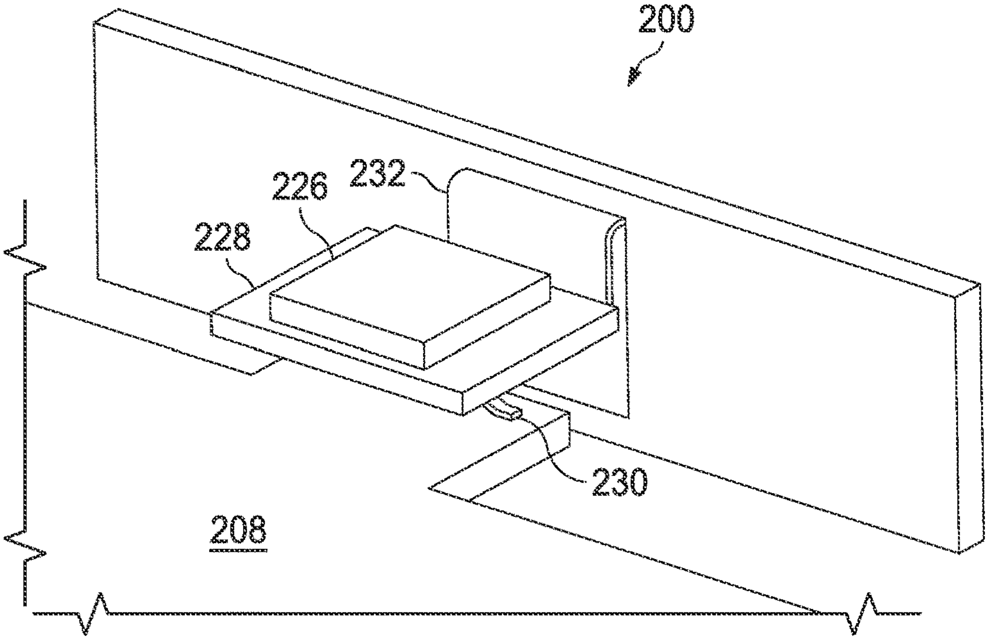
FIG. 4D is another embodiment of an angular backside view of the embodiment antenna system.

FIG. 4D illustrates an angular backside view of the embodiment antenna 200 with an alternative arrangement of components and electrical connections than the embodiment shown in FIG. 4C. In this embodiment, an integrated circuit (IC) 226 is located on a sub-board 228. In some embodiments, the sub-board 228 may be a printed circuit board. In other embodiments, the sub-board 228 may be a flex circuit board. The sub-board 228 may be connected to the main board using a circuit clip (c-clip) 230. The sub-board 228 may be connected to the patch array antenna 202 using a connector 232, such as a flex circuit.

Figure 5A:
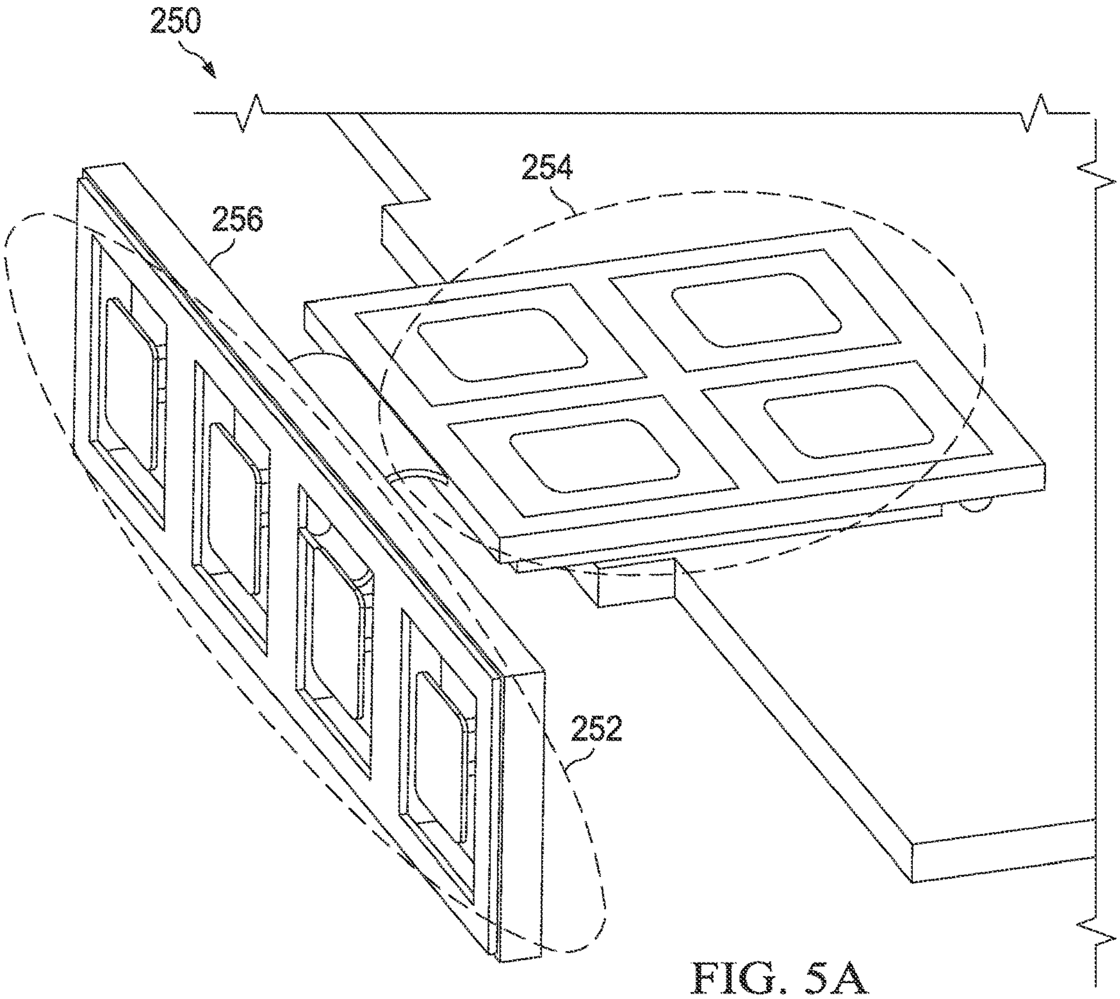
FIGS. 5A-B are multi-angle views of an embodiment antenna system.
Figure 5B:
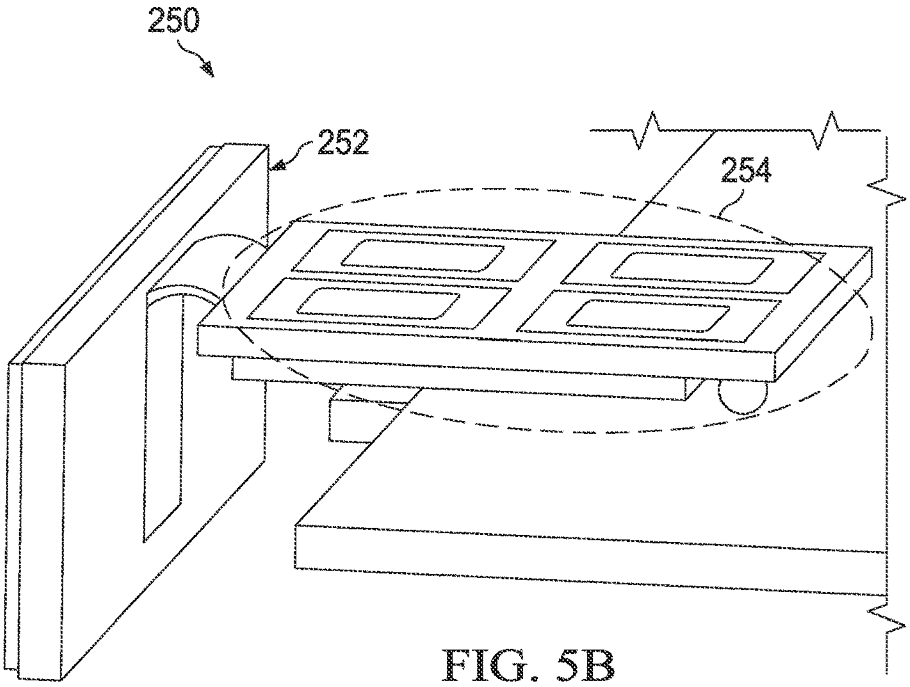

FIGS. 5A-B illustrate multi-angular views of an embodiment antenna system 250. In particular, FIG. 5A illustrates an angular topside view of the antenna system 250. FIG. 5B illustrates an angular side-view of the antenna system 250. The antenna system 250 includes a first patch array antenna 252 and a second patch array antenna 254, each operating over the mmWave frequency spectrum. The antenna system 250 also includes a third antenna 256 configured to operate over the sub-6 GHz frequency spectrum.

As shown, the first patch array antenna 252 is shown to have four elements arranged in a single row (i.e., 1×4 patch array antenna). Likewise, the second patch array antenna 254 is shown to have four elements. However, the four elements are arranged in two columns and two rows (i.e., 2×2 patch array antenna). The 1×4 patch array antenna 252 radiates through an opening of a mobile device, for example, an opening on the side metal frame. The 1×4 patch array antenna 252 provides coverage at the side of the phone.

The patch array antenna 254 may be positioned on the backside of the mobile device. In an embodiment, the backside of the mobile device may be a dielectric structure (i.e., back cover). In such an embodiment, the patch array antenna 254 provides backside reception coverage for the mobile device.

In other embodiments, the patch array antennas 252 and 254 may each include different number of elements and may be arranged in different configurations. As an example, in an alternative configuration and design, the first patch array antenna 252 may have eight elements arranged in a single row (i.e., 1×8 patch array antenna). In another configuration and design, the first patch array antenna 252 may have six elements arranged in two rows (i.e., 2×3 patch array antenna). Similarly, in an embodiment, the second patch array antenna 254 may have 8 elements arranged in two columns and four rows (i.e., 2×4 patch array antenna). In another embodiment, the second patch array antenna 254 may have 16 elements arranged in four columns and four rows (i.e., 4×4 patch array antenna). Therefore, it should be understood that the number of elements in each patch array antenna 252 and 254 is non-limiting and each may have varying number of elements in a variety of configurations.

Figure 6A:
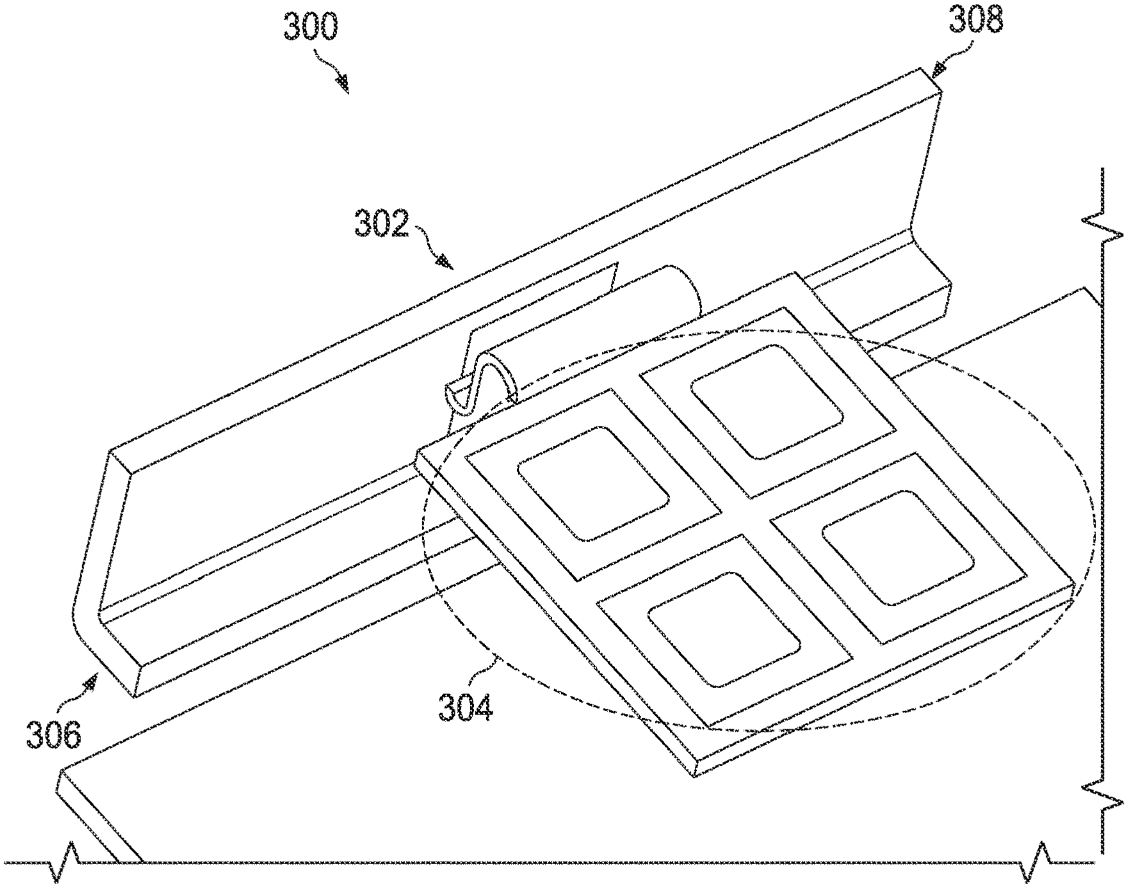
FIGS. 6A-C are multi-angle views of an embodiment antenna system.
Figure 6B:
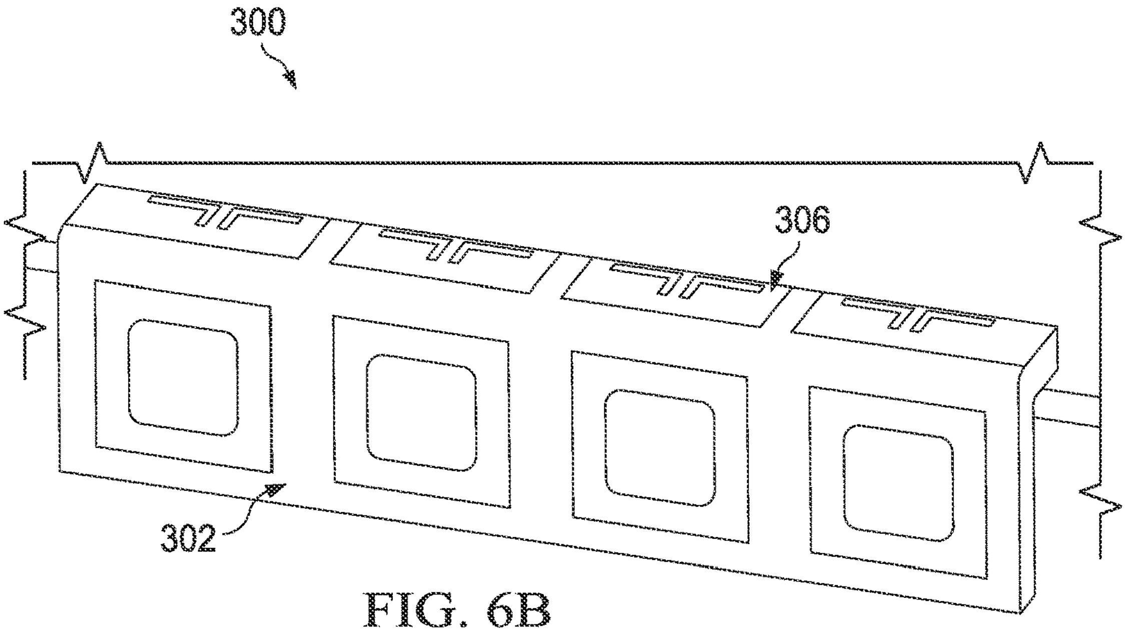
Figure 6C:
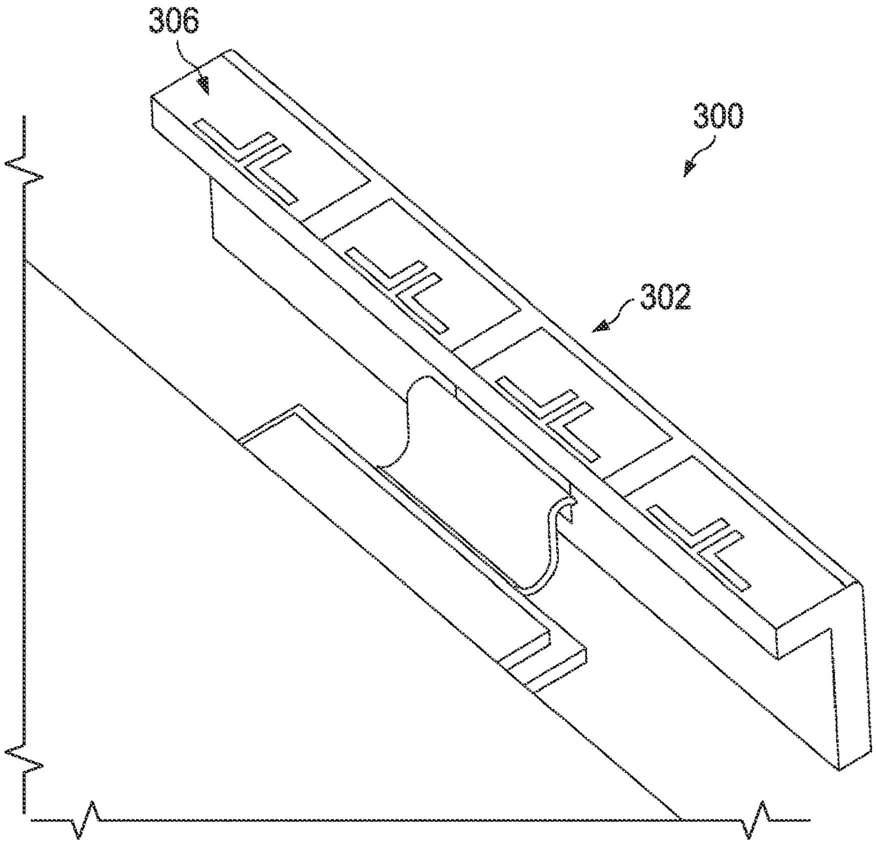

FIGS. 6A-C illustrate multi-angular views of an embodiment antenna system 300. The antenna system 300 includes three different patch array antennas providing a three sided reception and transmission coverage for a host device. FIG. 6A illustrates an angular top-side view of the antenna system 300. FIG. 6B illustrates an angular side-view of the antenna system 300. FIG. 6C illustrates an angular bottom-side view of the antenna system 300. The antenna system 300 includes a first patch array antenna 302, a second patch array antenna 304, and a third patch array antenna 306. Each patch array antenna is configured to operate over the mmWave frequency spectrum. The antenna system 300 also includes a fourth antenna 308 configured to operate over the sub-6 GHz frequency spectrum.

As shown, the first patch array antenna 302 and the third patch array antenna 306 are shown to have four elements arranged in a single row (i.e., 1×4 patch array antenna). Likewise, the second patch array antenna 304 is shown to have four elements. However, the four elements in the second patch array antenna 304 are arranged in two columns and two rows (i.e., 2×2 patch array antenna).

The first patch array antenna 302 is shown as a 1×4 dual-polarized patch array antenna. The second patch array antenna 304 is shown as a 2×2 dual-polarized patch array antenna. The third patch array antenna 306 is shown as a 1×4 single-polarized patch array antenna.

The first patch array antenna 302 may be placed on a side of a host device, providing a coverage area in the direction perpendicular to the side structure and away from the internal components of the host device. The structure of the host device may include openings in a metal frame in which the elements of the first patch array antenna 302 may be able to radiate. In an embodiment, the metal side frame may be a ground plane for the fourth antenna 308 and the first patch array antenna 302.

The second patch array antenna 304 may be placed on the backside of the host device, providing a coverage area in the direction perpendicular to the backside and away from the internal components of the host device. The backside of the host device may include a dielectric back cover (i.e., non-metal) that allows for the elements of the second patch array antenna 304 to radiate outwards without being reflected back to the device. The backside cover may additionally provide protection from damage without having the second patch array antenna 304 being directly exposed to natural elements.

The third patch array antenna 306 may be placed on the opposite plane to the second patch array antenna 304. In such an arrangement, the third patch array antenna 306 may be able to radiate between the metal frame and the display of the host device. The third patch array antenna 306 may then provide a coverage area in the direction perpendicular to the front-side of the and away from the internal components of the host device.

In other embodiments, the patch array antennas 302, 304, and 306 may each include different number of elements and may be arranged in different configurations. Therefore, it should be understood that the number of elements in each patch array antenna 302, 304, and 306 is non-limiting, and each antenna may have varying number of elements that are arranged in a variety of configurations.

Figure 7A:
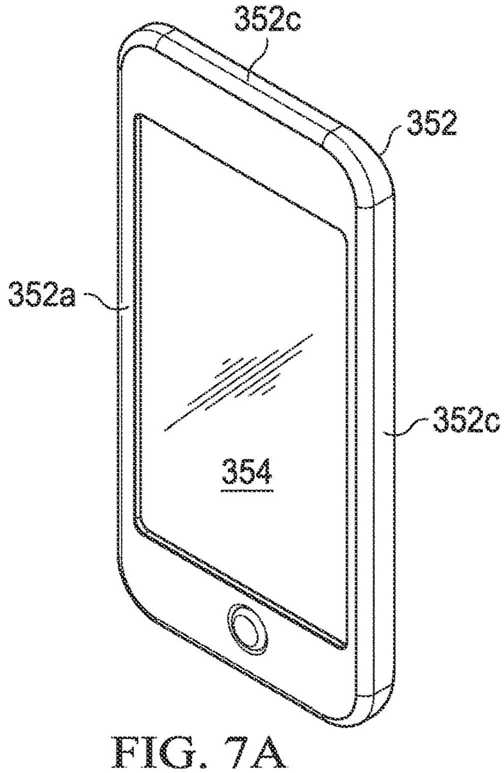
FIGS. 7A-B are multi-angle views of an embodiment host device.
Figure 7B:
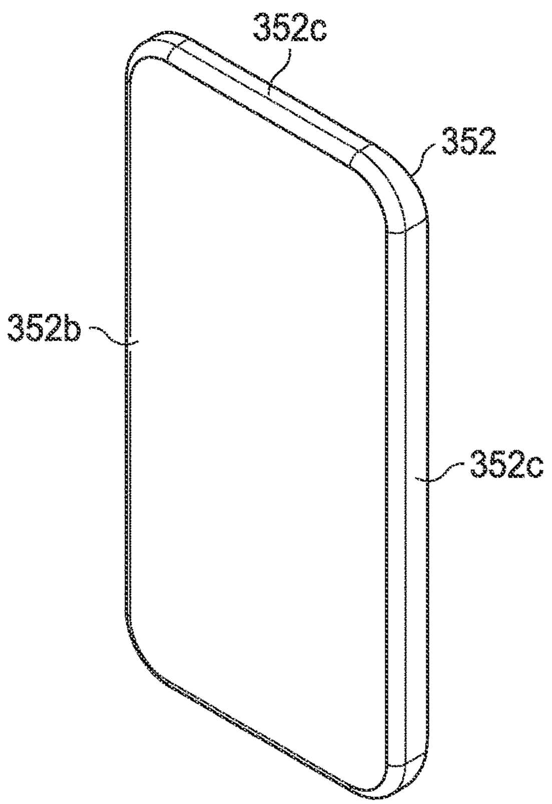

FIGS. 7A-7B illustrate an embodiment host device 350. FIG. 7A is a front side view of the host device 350 and FIG. 7B is a backside view of the host device 350. The host device 350 may be a cellular phone, a tablet device, or the like capable of operating over multiple RATs. As shown, the host device 350 includes a housing 352. The housing 352 includes an front surface 352*a*, an back surface 352*b*, and side surfaces 352*c*. The front surface 352*a* includes a display region 354. Optionally, the back surface 352*b* may be a removable or non-removable back cover made of a dielectric material.

The housing of the electronic device 100 is generally composed of a conductive metal (e.g., aluminum, magnesium, etc.), plastic (polycarbonates, etc.), glass (e.g., aluminosilicate glass, etc.), and/or other materials (e.g., composites) that provide similar rigidity, strength and/or durability. In an embodiment, parts of the metal in the panels may be used as an external antenna. In another embodiment, the panels may be made of metal and have plastic or glass openings or be made of plastic or glass to allow for reception or transmission of an internal antenna.

The host device 350 may host one or more of the antennas previously disclosed in this disclosure. In an example, the antennas 202 and 204 of FIGS. 4A-D may be located at the side portions 352*c* and radiate outwardly and away from the host device 350. In another example, the antenna 252 in FIGS. 5A-5B may be located at the side portions 352*c* and the antenna 254 may be located at the back surface 352*b*. The antennas 252 and 254 radiate outwardly and away from the host device 350. As another example, the antenna 302 in FIGS. 6A-6C may be located at the side portions 352*c*, the antenna 304 may be located at the back surface 352*b*, and the antenna 306 may be located at the front surface 352*a*. In this example, the antennas 302, 304, and 306 radiate outwardly and away from the host device 350.

Generally, each antenna is strategically placed to reduce the signal interference with respect to the signal radiating from other antennas of the device. One effective method to improve isolation is by physically separating the antennas from each other. Another method to improve isolation is by placing the antennas such that the polarization of the antennas are orthogonal to each other. As an example, antennas may be arranged at a horizontal and/or vertical offset in relation to each other, as the signal coupling is generally reduced as a function of its distance. As another example, antennas may be placed perpendicular to each other to create different polarizations.

Most modern wireless devices have several antennas of a number of varieties. Generally, a wireless device may have a primary cellular antenna, a diversity cellular antenna, a global positioning satellite (GPS) antenna, a WiFi antenna, and a near field communication (NFC) antenna. Other antennas may be included to achieve specific communication goals. Alternatively, some antennas may be omitted, for example, to reduce the size, complexity and/or cost of the wireless device. Additionally, to improve performance or as an alternative to the primary antenna, a wireless device may have one or more of each type of antenna. Some non-cellular antennas may be for receivers, such as in a GPS antenna, while other non-cellular antennas, such as in the WiFi antenna, may be for a transmitter and a receiver.

In a cellular device, the primary cellular antenna is the primary communication antenna and is responsible for the transmission and reception of analog and digital signals. Generally, for a mobile phone, the location of the primary cellular antenna is at the lower vertical position of the cellular device. This is typically done to reduce the specific absorption rate (SAR) and increase the total radiated power (TRP) by moving the bulk of the antenna away from the human head.

The primary cellular antenna may typically be of a planar inverted-F antenna (PIFA), a folded inverted-F antenna, a monopole antenna, a loop antenna, microstrip patch antenna, a folded inverted conformal antenna type, or a modified version of any one of the foregoing or other type of antennas. In general, many different types of antennas may be used to support the various regulatory and system requirements specific to different carriers.

In some devices, secondary cellular antennas or diversity antennas are added as an alternative to the primary cellular antenna. In a typical antenna configuration, the secondary cellular antenna or the diversity antenna is for receiving only (or for receiving and transmitting when transmit diversity is supported). As a signal is being transmitted from, for example, a cellular tower to a wireless cellular device, the receiving device may receive more than one copy of the original signal due to the multipath propagation, as a result of signal reflection and dispersion. The secondary cellular antenna may be a same antenna type as the primary cellular antenna. Alternatively, the secondary cellular antenna may be a different type of antenna that operates at a same frequency as the primary cellular antenna.

In a wireless device having multiple diversity antennas, the wireless data modem selects the strongest signal from the various signal copies received at the multiplicity of antennas. Alternatively, the wireless data modem may combine the received signals to increase the received signal power level and the signal to noise ratio (SNR) of the received signal by combining and weighing the signals from the different paths. Furthermore, in an antenna diversity scheme, multiple methods can be used to increase signal reliability.

In addition to diversity antennas, modern cellular devices may take advantage of multiple-input and multiple-output (MIMO) technology. Typically, a simple wireless communication system is usually of a single-input and single-output (SISO) type. In a SISO system, a single antenna may be used as a transmitter and a single antenna may be used as the receiver. MIMO is a smart antenna technology that uses a multiplicity of antennas to take advantage of multipath propagation to send and receive signals simultaneously over the same radio channel. MIMO technology can be of the diversity type to improve the reliability of the signal or of the spatial-multiplexing type which increases data throughput. Other MIMO type techniques are available that improve both the reliability and data throughput. In all instances, MIMO relies on a plurality of antennas to improve wireless communication performance. MIMO technology may have two or more antennas at each of the transmit or receive ends of the communication paths. A 2×2 MIMO is a configuration where two antennas are at the transmit end and two antennas are arranged in the receive end. A 4×4 MIMO is a configuration where four antennas are at the transmit end and four antennas are at the receive end. As another example, an 8×8 MIMO is a configuration with eight antennas at each of the transmit and receive ends. In general, the greater the number of antennas, the greater the bandwidth capacity, data speed transfer, and signal reliability.

The physical proximity of the primary and diversity antennas in a wireless device may contribute to correlation of received signal from different antennas, and as a result reduce diversity gain and MIMO throughput. Typically, the diversity antenna is arranged at the upper vertical position of the cellular device to maximize the distance between it and the primary antenna. In an embodiment, an antenna arrangement is disclosed that increases isolation and reduces correlation between the primary and secondary antennas in a device with an extended display. In another embodiment, a ground plane slot structure separates the two ground plane regions to improve isolation and reduce correlation between antennas.

Figure 8:
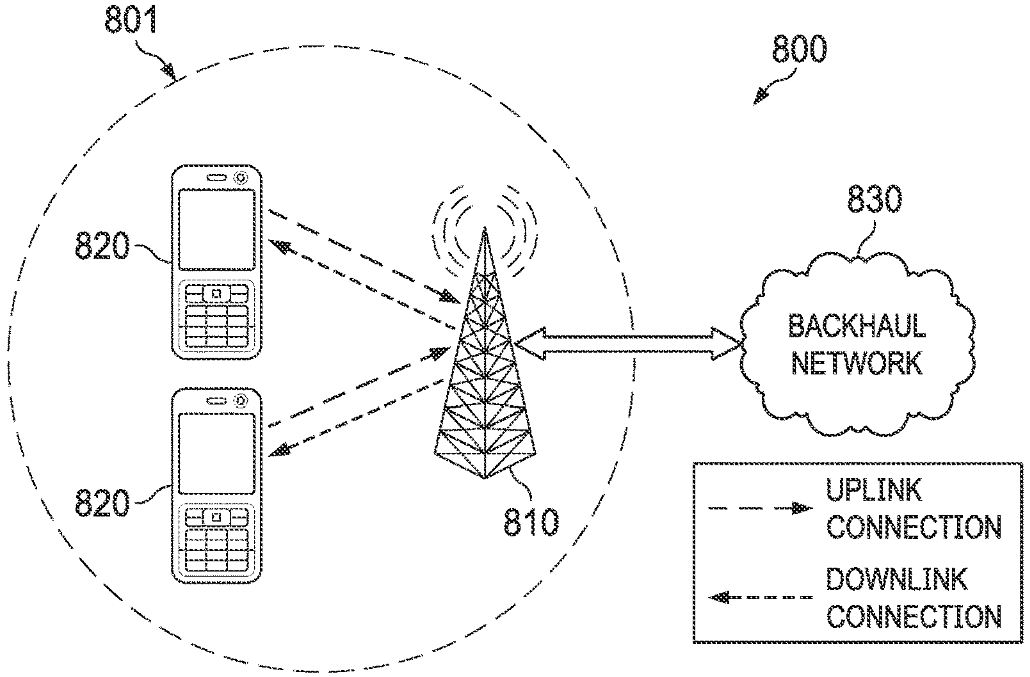
FIG. 8 is a diagram of an embodiment wireless communications network.

FIG. 8 is a diagram of a network 800 for communicating data. The network 800 includes a base station 810 having a coverage area 801, a plurality of UEs 820, and a backhaul network 830. As shown, the base station 810 establishes uplink (dashed line) and/or downlink (dotted line) connections with the UEs 820, which serve to carry data from the UEs 820 to the base station 810 and vice-versa. Data communicated over the uplink/downlink connections may include data communicated between the UEs 820, as well as data communicated to/from a remote-end (not shown) byway of the backhaul network 830. As used herein, the term "base station" refers to any network-side device configured to provide wireless access to a network, such as an enhanced Node B (eNodeB or eNB), a gNB, a transmit/receive point (TRP), a macro-cell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. As used herein, the term "UE" refers to any user-side device configured to access a network by establishing a wireless connection with a base station, such as a mobile device, a mobile station (STA), a vehicle, and other wirelessly enabled devices. In some embodiments, the network 800 may include various other wireless devices, such as relays, low power nodes, etc. While it is understood that communication systems may employ multiple access nodes capable of communicating with a number of UEs, only one base station 810, and two UEs 820 are illustrated for simplicity.

Figure 9:
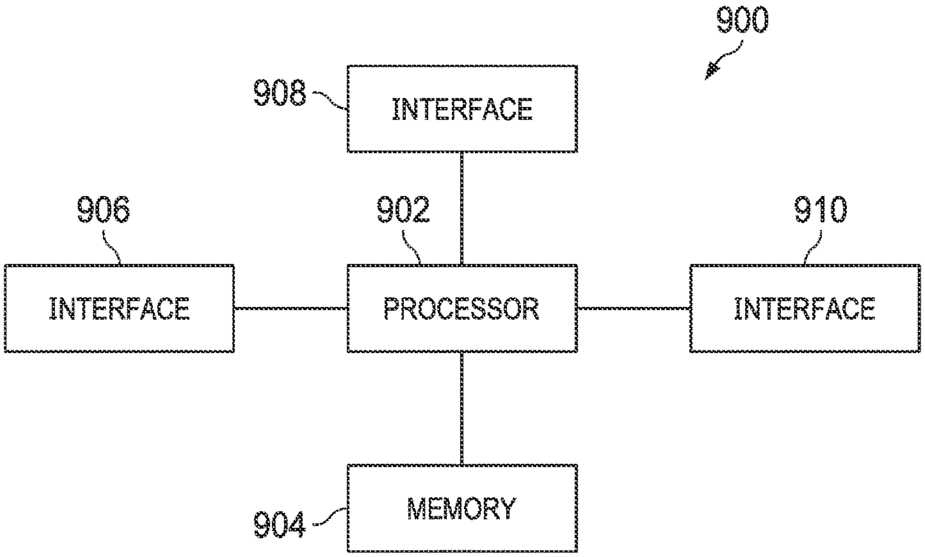
FIG. 9 is a diagram of an embodiment processing system.

FIG. 9 illustrates a block diagram of another embodiment processing system 900 for performing methods described herein, which may be installed in a host device. As shown, the processing system 900 includes a processor 902, a memory 904, and interfaces 906, 908, 910 which may (or may not) be arranged as shown in FIG. 9. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 910 may be any component or collection of components that allow the processing system 900 to communicate with other devices/components and/or a user. In an embodiment, one or more of the interfaces 906, 908, 910 may be adapted to communicate data, control, or management messages from the processor 902 to applications installed on the host device and/or a remote device. As another embodiment, one or more of the interfaces 906, 908, 910 may be adapted to allow a user or user device (e.g., personal computer (PC), etc.) to interact/communicate with the processing system 900. The processing system 900 may include additional components not depicted in FIG. 9, such as long-term storage (e.g., non-volatile memory, etc.).

In some embodiments, the processing system 900 is included in a network device that is accessing, or part otherwise of, a telecommunications network. In one embodiment, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

Figure 10:
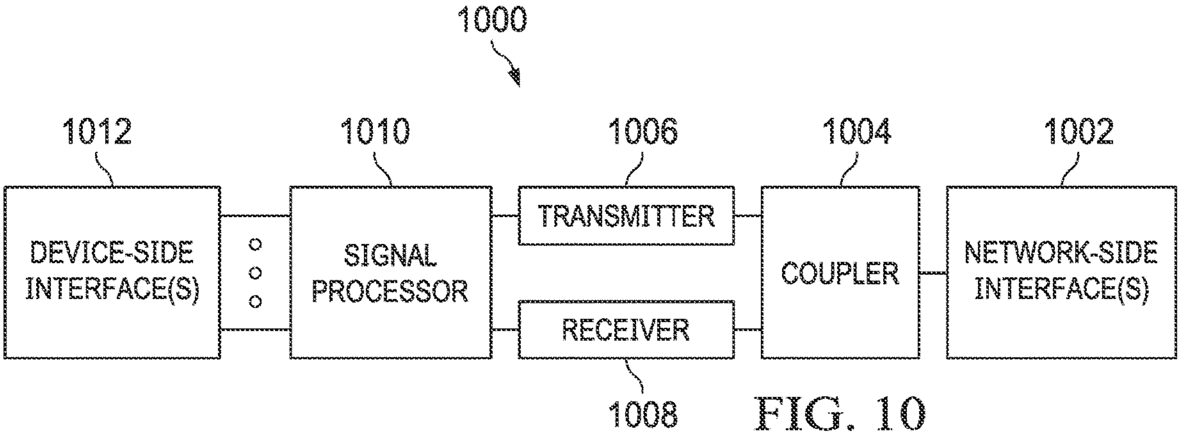
FIG. 10 is a diagram of an embodiment transceiver.

In some embodiments, one or more of the interfaces 906, 908, 910 connects the processing system 900 to a transceiver adapted to transmit and receive signaling over the telecommunications network. FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. In some embodiments, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. In some embodiments, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. An antenna system in an electronic device, the antenna system comprising:

a first antenna configured to operate at a first frequency band, wherein the first antenna comprises a plurality of openings; and a second antenna configured to operate at a second frequency band, wherein a feeding network of the second antenna is embedded within a transmission line medium of a signal return path of the first antenna such that the transmission line medium comprises the feeding network of the second antenna, wherein the second antenna comprises an array of antenna elements, at least one antenna element of the array of antenna elements is inside one of the plurality of openings of the first antenna and configured to radiate through the one of the plurality of openings of the first antenna, wherein the electronic device comprises a first printed circuit board (PCB) comprising a processor and a modem, and wherein the second antenna further comprises:

a flex circuit;

a circuit clip (c-clip);

a second PCB electrically coupled to the first PCB using the c-clip or a flex circuit board electrically coupled to the first PCB using the c-clip; and an integrated circuit (IC) mounted on the second PCB or on the flex circuit board, the IC configured to electrically couple to the array of antenna elements of the second antenna using the flex circuit.

2. The antenna system of claim 1, wherein the transmission line medium is a stripline transmission line.

3. The antenna system of claim 1, wherein the first antenna is an inverted-F antenna (IFA), a loop antenna, or a slot antenna.

4. The antenna system of claim 1, wherein the signal return path of the first antenna is to a ground plane.

5. The antenna system of claim 1, wherein a ground plane of the first antenna is a ground plane of the second antenna.

6. The antenna system of claim 1, wherein a radiating element of the first antenna is a ground plane of the second antenna.

7. The antenna system of claim 6, the array of antenna elements of the second antenna configured to radiate at millimeter-wave frequencies, each antenna element of the array of antenna elements being inside a different one of the plurality of openings of the first antenna and radiating through the different one of the plurality of openings of the first antenna.

8. The antenna system of claim 6, the array of antenna elements configured to radiate at millimeter-wave frequencies.

9. The antenna system of claim 6, wherein the array of antenna elements is configured to radiate at millimeter-wave frequencies, and wherein the first antenna is a corresponding ground plane of each antenna element in the array of antenna elements.

10. The antenna system of claim 1, wherein the second antenna is a dual polarized patch array antenna, a single polarized patch array antenna, a dipole antenna, a monopole antenna, or an aperture antenna.

11. The antenna system of claim 1, wherein the second antenna is located within a metal frame of the electronic device.

12. The antenna system of claim 1, wherein the electronic device comprises:

a front comprising a display;

a back opposing the front and comprising a back cover; and a side perpendicular to the front and the back and connecting the front to the back.

13. The antenna system of claim 12, wherein the back cover comprises a dielectric material; and wherein the first antenna comprises an internal metal frame located between the back cover and the front of the electronic device, the first antenna configured to radiate outwards and away from the back of the electronic device.

14. The antenna system of claim 12, wherein the back cover comprises a dielectric material; and wherein the first antenna comprises a metal on top of dielectric carrier, the first antenna configured to radiate outwards and away from the back of the electronic device.

15. The antenna system of claim 12, further comprising a third antenna configured to operate at millimeter-wave frequencies, the third antenna located on the back of the electronic device and configured to radiate outwards and away from the back of the electronic device.

16. The antenna system of claim 15, further comprising a fourth antenna configured to operate at the millimeter-wave frequencies, the fourth antenna located on the front of the electronic device and configured to radiate outwards and away from the front of the electronic device.

17. The antenna system of claim 1, wherein the second antenna comprises a first side and a second side opposing the first side, the array of antenna elements of the second antenna located on the first side.

18. The antenna system of claim 17, wherein the electronic device comprises a printed circuit board (PCB) having a board-to-board connector, and wherein the second antenna further comprises an integrated circuit (IC) mounted on an opposing second side of the second antenna and a flex circuit configured to electrically couple the IC to the PCB through the board-to-board connector.

19. The antenna system of claim 1, wherein the first frequency band is a sub-6 gigahertz (GHz) frequency band and the second frequency band is a millimeter-wave frequency band.

20. An antenna system in an electronic device, the antenna system comprising:

a first antenna configured to operate at a first frequency band, wherein the first antenna comprises a plurality of openings; and a second antenna configured to operate at a second frequency band, wherein a feeding network of the second antenna is embedded within a transmission line medium of a signal return path of the first antenna such that the transmission line medium comprises the feeding network of the second antenna and that the transmission line medium and a feeding network of the first antenna are non-overlapping, wherein the electronic device comprises a first printed circuit board (PCB) comprising a processor and a modem, and wherein the second antenna further comprises:

a flex circuit;

a circuit clip (c-clip);

a second PCB electrically coupled to the first PCB using the c-clip or a flex circuit board electrically coupled to the first PCB using the c-clip; and an integrated circuit (IC) mounted on the second PCB or on the flex circuit board, the IC configured to electrically couple to an array of antenna elements of the second antenna using the flex circuit.

21. The antenna system of claim 20, wherein the second antenna further comprises:

a first array of patch antennas, each patch antenna of the first array of patch antennas configured to radiate through a respective opening of a metal frame of the electronic device, the openings of the metal frame located perpendicular to a display side of the electronic device; and a second array of patch antennas, each patch antenna of the second array of patch antennas configured to radiate through a dielectric back cover of the electronic device, the dielectric back cover located opposite a non-display side of the electronic device.

22. The antenna system of claim 20, wherein the second antenna further comprises a single polarized dipole array, wherein each element in the single polarized dipole array is configured to radiate between a metal frame and a display side of the electronic device.

23. An electronic device, the electronic device comprising:

a non-transitory memory storage comprising instructions;

one or more processors configured to execute the instructions; and an antenna system in communication with the one or more processors and the non-transitory memory storage, the antenna system comprising:

a first antenna configured to operate at sub-6 gigahertz (GHz) frequencies, wherein the first antenna comprises a plurality of openings; and a second antenna configured to operate at millimeter-wave frequencies, wherein a feeding network of the second antenna is embedded within a transmission line medium of a signal return path of the first antenna such that the transmission line medium comprises the feeding network of the second antenna and that the transmission line medium and a feeding network of the first antenna are non-overlapping, wherein the electronic device further comprises a first printed circuit board (PCB) comprising the one or more processors and a modem, and wherein the second antenna further comprises:

a flex circuit;

a circuit clip (c-clip);

a second PCB electrically coupled to the first PCB using the c-clip or a flex circuit board electrically coupled to the first PCB using the c-clip; and an integrated circuit (IC) mounted on the second PCB or on the flex circuit board, the IC configured to electrically couple to an array of antenna elements using the flex circuit.

24. The electronic device of claim 23, wherein the electronic device further comprises:

a front comprising a display;

a back opposing the front and comprising a back cover; and a side perpendicular to the front and the back and connecting the front to the back.

25. The electronic device of claim 23, wherein the electronic device is a cellular device, a tablet, a personal computer, a mobile station (STA), a smartwatch, a cellular-connected vehicle, an enhanced Node B (eNodeB or eNB), a gNB, a transmit/receive point (TRP), a macro-cell, a femtocell, or a Wi-Fi Access Point (AP).

* * * * *